ROBERT G. ADAM
INVENTOR.

BY

Robert K. Rhea
AGENT

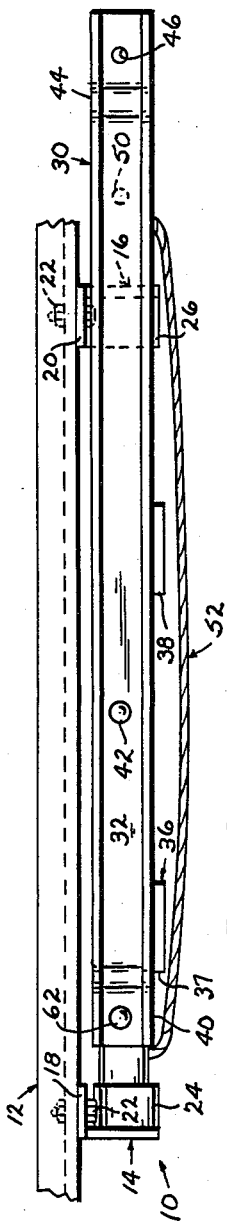
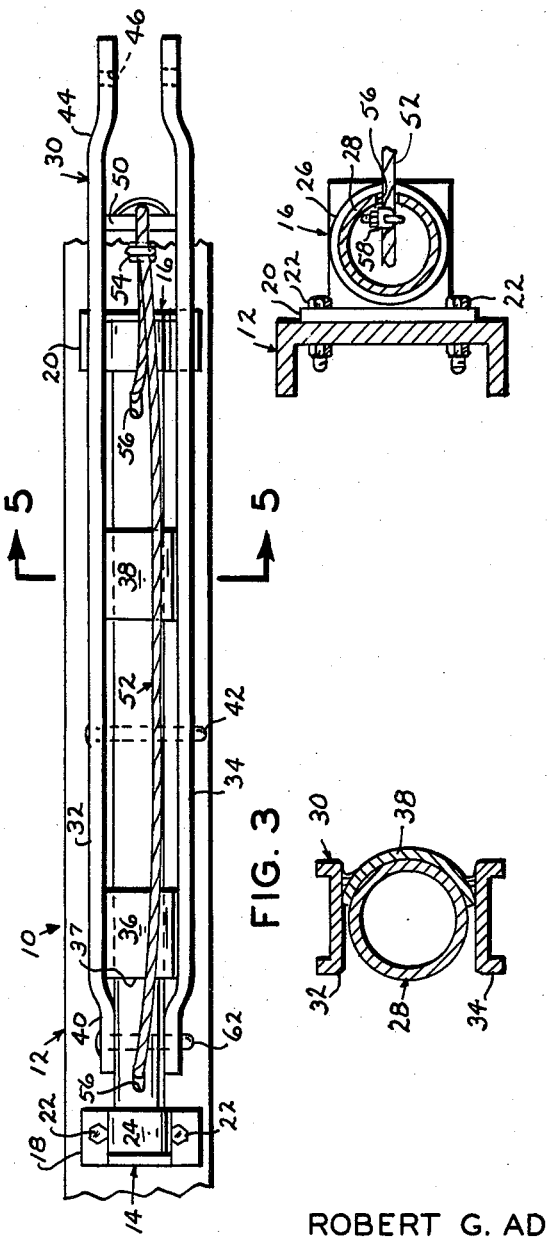

United States Patent Office 3,105,706
Patented Oct. 1, 1963

3,105,706
COLLAPSIBLE TOW HITCH
Robert G. Adam, Box 445, Okeene, Okla.
Filed July 3, 1961, Ser. No. 121,621
4 Claims. (Cl. 280—491)

The present invention relates to a tow hitch or tow bar for motor vehicles and more particularly to a collapsible type of tow hitch.

The prior art reveals a number of collapsible or folding towing devices, the majority of which are rather large and complicated requiring the use of a number of angle irons or brackets while others require the modification of the bumper to which the hitches are connected or form a part of. None of the devices of the prior art, of which I am aware, reveal a collapsible type tow hitch of simplified sturdy construction which may be manufactured at a relatively low cost and connected with the bumper of existing vehicles.

The principal object of the instant invention is to provide a simplified collapsible tow hitch comprising a tow bar and a braced tongue member.

Another object is to provide a tow hitch which may be easily connected with the bumper of any vehicle.

Still another object is to provide a tow hitch which may be installed on the front bumper of a vehicle and, when in collapsed position, adds very little to the length of the vehicle.

A further object is to provide a device of this class which may be quickly and easily swung from a towing position to an "out of use" position.

Still another object is to provide a device of this class which is sturdily constructed and which is not liable to fail during use.

The present invention accomplishes these and other objects by connecting an elongated member to the forward surface of the bumper and removably connecting a tongue member to the elongated member. The tongue is braced by a cable connected at its free ends to the opposing end portions of the elongated member and secured, medially its ends, to the forwardly extending end portion of the tongue.

Other objects will be apparent from the following description when taken in conjunction with the accompanying two sheets of drawings, wherein:

FIGURE 2 is a view similar to FIG. 1, illustrating the device in fully collapsed position;

Figure 1:
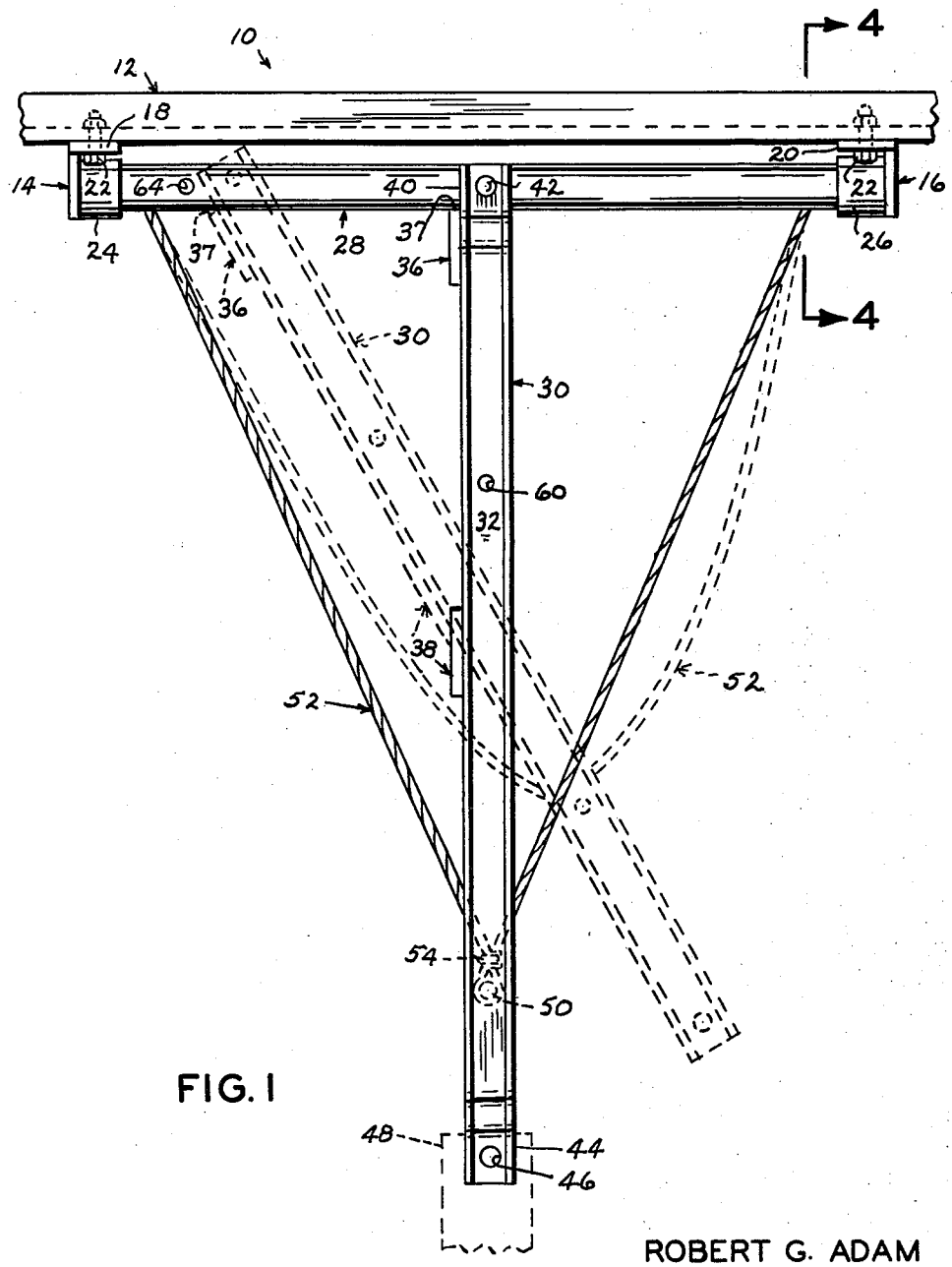
FIGURE 1 is a top plan view of the device in operative position and illustrating, by dotted lines, the movement of the tongue member toward a collapsed position.

FIGURE 3 is a front elevational view of a fragment of a vehicle bumper illustrating the device in fully collapsed position thereon; and, FIGURES 4 and 5 are vertical cross-sectional views taken along the lines 4—4 and 5—5 of FIGS. 1 and 3, respectively.

Like characters of reference designate like parts in those figures of the drawings in which they occur.

In the drawings:

The reference numeral 10 indicates the device, as a whole, which is substantially T-shaped in general configuration. The numeral 12 indicates a fragment of a bumper connected to the forward end of a vehicle, not shown. A pair of bearing-like brackets 14 and 16, each having flanged edges 18 and 20, respectively, are connected to the bumper 12 by bolts 22 extended through the flanges and bumper. Each of the brackets 14 and 16 further includes tubular collars 24 and 26, respectively, opening inwardly toward each other in horizontal aligned relation. An elongated tubular member 28 extends between and is journaled at its opposing end portions by the collars 24 and 26. An elongated tongue 30, comprising a pair of channel-like upper and lower bars 32 and 34, respectively, are joined in parallel spaced-apart relation by a pair of webs 36 and 38. Each of the webs is formed of plate metal which is arcuately curved outwardly of the bars intermediate its ends forming an inside radius for the webs substantially equal to the radius of the member 28 for the purposes which will presently be apparent. The rearward end portion 40 of the tongue 30 is connected to the member 28 by a latch pin 42 extending through suitable aligned apertures formed in the rearward end portion of the tongue and the central portion of the member 28. The web 36 is positioned, with respect to the rearward end of the tongue, so that the rearward edge surface 37 of the web 36 contacts a peripheral portion of the surface of the member 28 in sliding relation to align the apertures receiving the pin 42. The web 36, in co-operation with the bars 32 and 34, forms a rearward clevis-like end on the tongue 30. The forward end portion 44 of the tongue is similarly provided with aligned apertures 46 for connection with the towing vehicle, indicated by dotted lines at 48. A post 50 extends vertically between and is connected at its respective ends to the upper bar 32 and lower bar 34 adjacent the forward end portion of the tongue 30. Similarly the post 50, in co-operation with the adjacent end portions of the bars 32 and 34, forms a clevis-like forward end of the tongue.

A selected length of cable 52, or the like, is wrapped around the post 50, medially the length of the cable, and is secured to the post by a wire line clamp 54, the free end portions of the cable 52 extend rearwardly of the post 30, and are inserted into the member 28 through suitable apertures 56 formed in the wall of the member 28 adjacent the collars 24 and 26, respectively. The free ends of the cable are tautly secured within the member 28 by a cable clamp 58 connected to the respective end portions of the cable.

Operation

In operation the device 10 is connected with the bumper 12 as explained hereinabove. When not in use, the device is collapsed to a folded position. Folding the tongue is accomplished by removing the pin 42 and manually sliding the rearward end portion 40 of the tongue along the member 28 toward the left, as viewed in FIG. 1 and as shown by dotted lines, and positioning the tongue bars 32 and 34 above and below, respectively, the elongated member 28 and bracket 16 wherein an aperture 60, formed intermediate the length of the tongue, is aligned with the central pin receiving aperture of the member 28 for receiving the pin 42. As shown in FIG. 2, a second pin 62 may be inserted through the aperture in the end portion 40 of the tongue through a cooperating aperture 64 formed in the member 28 adjacent the collar 24. The pins 42 and 62 thus maintain the tongue in a stored position longitudinally of the member 28. The inner surfaces of the webs 36 and 38 cooperatively contact a forwardly disposed peripheral portion of the member 28 when the tongue is in stored position (FIG. 5). When folding the tongue 30, the right hand portion of the cable, as viewed in FIG. 1, is manually pushed or slid through the interior of the member 28 so that this portion of the cable will be supported in an out of the way position. The tongue 30 is extended to an operative towing position by simply removing the pins 42 and 62 and manually sliding the rearward end portion 40 of the tongue toward the central aperture of the member 28 while the opposing free or forward end portion of the tongue is positioned forwardly of the tubular member 28. It should be noted that the relationship between the position of the web edge 37 and the length of the cable is such that contact of the web edge 37 with the member 28 places a tension on both portions of the cable 52 thus maintaining the tongue perpendicular with respect to the longitudinal axis of the member 28.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A collapsible tow hitch for a vehicle having a bumper including an elongated centrally apertured tubular member having a second aperture adjacent one of its ends; a pair of bearing-like brackets rigidly connected to said bumper and journaling the respective end portions of said elongated tubular member for rotation about a horizontal axis; a tongue member having opposing latch pin equipped clevis-like end portions, said tongue member being removably connected by one end portion to the central portion of said tubular member and extending outwardly therefrom perpendicular with respect to the longitudinal axis of the latter, said tongue member having an intermediate aperture spaced from its connection with said tubular member a distance equal to the spacing between the central and second aperture of the latter, said tongue member comprising an elongated pair of bars rigidly joined in parallel spaced-apart relation by a pair of webs extending between and connected respectively to confronting face surfaces of said bars, said webs being arcuately curved outwardly from the plane defining adjacent sides of said bars on a radius at least as great as the radius of said elongated tubular member, the spacing between said bars being at least as great as the outside diameter of said elongated tubular member for receiving the latter therebetween and cooperating latch pin receiving alignment of the respective apertures in said elongated tubular member and said tongue member when the latter is placed in collapsed position; and a cable secured medially its ends to the free end portion of said tongue member, the free end portions of said cable extending toward and tautly connected with the respective end portions of said tubular member.

2. Structure as specified in claim 1 and a post extending between and connected with the confronting face surfaces of said bars adjacent the free end portion of the latter; and clamp means securing said cable to said post and securing the free end portions of said cable with said tubular member.

3. A collapsible tow hitch for a vehicle having a bumper, including: a pair of brackets secured to said bumper in horizontal spaced relation, said brackets each having a socket; an elongated tubular member journaled at its opposing end portions by the respective socket of said brackets, said tubular member having a central pin receiving aperture and having a second pin receiving aperture adjacent one of its ends; a tongue member comprising a pair of parallel spaced-apart bars having an aligned aperture extending through its respective end portions, the spacing between said bars being great enough to receive said tubular member therebetween; at least one web rigidly connected to confronting face surfaces of said bars, said web extending arcuately outward from said bars on a radius at least as great as the radius of said tubular member; a latch pin removably extending through one end portion of said tongue member and the central aperture of said tubular member, said tongue member having an intermediate pin receiving aperture spaced from said latch pin a distance equal to the spacing between the central and second apertures in said tubular member, whereby the intermediate aperture and the aligned aperture in one end of said tongue are respectively aligned with the central and second apertures in said elongated tubular member when said tongue member is placed in collapsed position; a second pin within the second aperture in said tubular member; a post extending between and rigidly connected with said bars adjacent their end portion opposite said tubular member; and a cable connected medially its ends with said post and projecting toward and tautly secured at its respective end portions to the respective end portions of said tubular member.

4. A collapsible tow hitch for a vehicle having a bumper, including: a pair of brackets secured to said bumper in horizontal spaced relation, said brackets each having a socket; an elongated tubular member journaled at its opposing end portions by the respective socket of said brackets, said tubular member having an opening through its wall adjacent each said bracket and having a central pin receiving aperture and a second pin receiving aperture adjacent one of its ends; a tongue member comprising a pair of parallel spaced-apart bars having an aligned aperture extending through its respective end portions and having an intermediate aperture spaced from one end aperture a distance equal to the spacing between the central and second pin receiving apertures in said tubular member, the spacing between said bars being great enough to receive said tubular member therebetween; at least one web extending between and rigidly connected to confronting face surfaces of said bars, said web extending arcuately outward from the plane defined by one side edge of said bars on a radius at least as great as the radius of said tubular member for receiving and nesting the latter between said bars with the intermediate aperture and the aligned aperture in one end of said tongue member respectively aligned with the central and second pin receiving apertures of said tubular member when said tongue member is placed in collapsed position; a latch pin removably connecting one end portion of said tongue member to the central portion of said tubular member; a second pin removably received by the second aperture in said tubular member; a post extending between and rigidly connected with said bars adjacent their end portion opposite said tubular member; a cable connected medially its ends with said post and projecting tautly rearward of the free end of said tongue member into said tubular member through the openings therein; and a cable clamp secured to each free end portion of said cable within said tubular member.

References Cited in the file of this patent

UNITED STATES PATENTS

| | | |
|---|---|---|
| 2,306,388 | Johnson et al. | Dec. 29, 1942 |
| 2,812,956 | Edinger | Nov. 12, 1957 |
| 2,826,431 | Able et al. | Mar. 11, 1958 |